United States Patent
Nakahara et al.

(10) Patent No.: US 10,287,380 B2
(45) Date of Patent: May 14, 2019

(54) COPOLYMER, AND MOLDED ARTICLE

(71) Applicant: KURARAY CO., LTD., Kurashiki-shi (JP)

(72) Inventors: Atsuhiro Nakahara, Tainai (JP); Hiroshi Ozawa, Tainai (JP); Takashi Fukumoto, Tainai (JP); Nobutaka Hiraoka, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 9 days.

(21) Appl. No.: 15/111,386

(22) PCT Filed: Jan. 7, 2015

(86) PCT No.: PCT/JP2015/050241
§ 371 (c)(1),
(2) Date: Jul. 13, 2016

(87) PCT Pub. No.: WO2015/107954
PCT Pub. Date: Jul. 23, 2015

(65) Prior Publication Data
US 2016/0326288 A1     Nov. 10, 2016

(30) Foreign Application Priority Data

Jan. 14, 2014   (JP) ................................. 2014-003862

(51) Int. Cl.
*C08F 220/14*     (2006.01)
*C08G 63/08*      (2006.01)
(Continued)

(52) U.S. Cl.
CPC .......... *C08F 220/14* (2013.01); *C08G 63/005* (2013.01); *C08G 63/08* (2013.01);
(Continued)

(58) Field of Classification Search
CPC .. C08F 220/14; C08F 220/216; C08F 220/38; C08F 224/00; C08F 265/04; C08G 63/08; C08G 63/005
See application file for complete search history.

(56) References Cited

U.S. PATENT DOCUMENTS 4,052,525 A     10/1977    Ide et al.
2005/0255397 A1  11/2005   Yamamoto et al.
(Continued)

FOREIGN PATENT DOCUMENTS

CN      1696835 A    11/2005
CN    101014635 A     8/2007
(Continued)

OTHER PUBLICATIONS

Extended European Search Report dated Jun. 8, 2017 in Patent Application No. 15737152.7.
(Continued)

*Primary Examiner* — Bijan Ahvazi
*Assistant Examiner* — David L Miller
(74) *Attorney, Agent, or Firm* — Oblon, McClelland, Maier & Neustadt, L.L.P.

(57) ABSTRACT

Provided are a break-resistant copolymer having high transparency and heat resistance and also having a high tensile strain at break, and a molded article.
A copolymer contains 80% by mass to 98% by mass of structural units derived from a methacrylic ester monomer and 2% to 10% by mass of ester structural units derived from a cyclic ketene acetal monomer. The copolymer has a weight average molecular weight of 80,000 or more and a molecular weight distribution of 1.75 to 3.80.

6 Claims, 1 Drawing Sheet

(51) Int. Cl.

| | | |
|---|---|---|
| *C08G 63/00* | (2006.01) | |
| *C08J 5/18* | (2006.01) | |
| *G02B 1/14* | (2015.01) | |
| *G02B 1/04* | (2006.01) | |
| *F21V 8/00* | (2006.01) | |
| *C09D 133/12* | (2006.01) | |
| *C08F 265/04* | (2006.01) | |
| *C08F 224/00* | (2006.01) | |
| *C08F 216/38* | (2006.01) | |

(52) U.S. Cl.
CPC .............. *C08J 5/18* (2013.01); *C09D 133/12* (2013.01); *G02B 1/04* (2013.01); *G02B 1/14* (2015.01); *G02B 6/0065* (2013.01); *C08F 216/38* (2013.01); *C08F 224/00* (2013.01); *C08F 265/04* (2013.01); *C08J 2333/12* (2013.01)

(56) References Cited

U.S. PATENT DOCUMENTS

| | | |
|---|---|---|
| 2008/0234439 A1 | 9/2008 | Yamamoto et al. |
| 2009/0036624 A1 | 2/2009 | Okimoto et al. |
| 2011/0160426 A1 | 6/2011 | Greiner et al. |
| 2011/0218303 A1 | 9/2011 | Oshima et al. |
| 2012/0313058 A1 | 12/2012 | Masuhara et al. |
| 2013/0217827 A1 | 8/2013 | Ozawa et al. |
| 2016/0185913 A1 | 6/2016 | Zhang et al. |

FOREIGN PATENT DOCUMENTS

| | | | |
|---|---|---|---|
| CN | 103396513 A | | 11/2013 |
| JP | 59-36645 B2 | | 9/1984 |
| JP | 7-33824 A | | 2/1995 |
| JP | 11-228633 A | | 8/1999 |
| JP | 11228633 A | * | 8/1999 ............. C08F 24/00 |
| JP | 2005-325262 A | | 11/2005 |
| JP | 2008-291138 A | | 12/2008 |
| JP | 2012-12476 A | | 1/2012 |
| JP | 2013-23461 A | | 2/2013 |
| JP | 2013-112790 A | | 6/2013 |
| JP | 2013-194037 A | | 9/2013 |
| JP | 2014-62228 A | | 4/2014 |
| JP | 2014-88542 A | | 5/2014 |
| JP | 2014-88543 A | | 5/2014 |
| WO | WO 2008/143245 A1 | | 11/2008 |
| WO | 2010/055798 A1 | | 5/2010 |
| WO | 2011/089794 A1 | | 7/2011 |
| WO | 2012/057079 A1 | | 5/2012 |
| WO | 2012/124395 A1 | | 9/2012 |

OTHER PUBLICATIONS

G. Evan Roberts, et al., "Radical Ring-Opening Copolymerization of 2-Methylene 1,3-Dioxepane and Methyl Methacrylate: Experiments Originally Designed to Probe the Origin of the Penultimate Unit Effect" Macromolecules, vol. 32, No. 5, 1999, pp. 1332-1340.

L. F. Sun, et al., "Synthesis and Enzymatic Degradation of 2-Methylene-1,3-Dioxepane and Methyl Acrylate Copolymers" Journal of Polymer Science, Dec. 15, 2003, pp. 2898-2904.

Holger Wickel, et al., "Homopolymers and Random Copolymers of 5,6-Benzo-2-methylene-1,3-dioxepane and Methyl Methacrylate: Structural Characterization Using 1D and 2D NMR," Macromolecules, vol. 36, No. 7, 2003, pp. 2397-2403.

Seema Agarwal, "Microstructural Characterisation and Properties Evaluation of Poly (methyl methacrylate-co-ester)s," Polymer Journal, vol. 39, No. 2, 2007, pp. 163-174.

International Search Report dated Feb. 24, 2015 in PCT/JP2015/050241 Filed Jan. 7, 2015.

* cited by examiner

[Fig. 1]
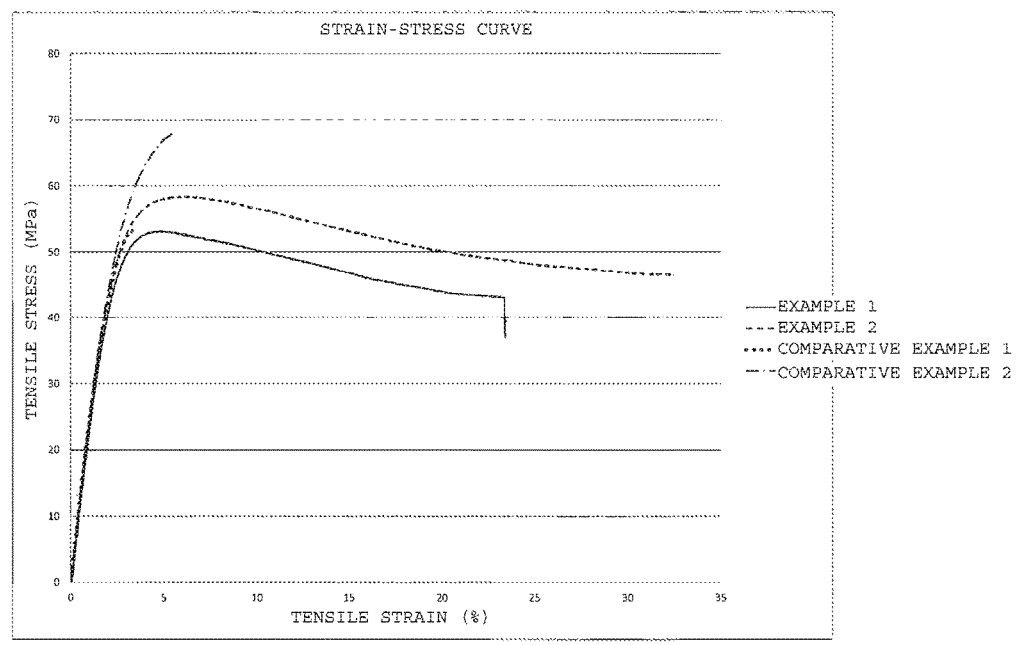
[Fig. 2]
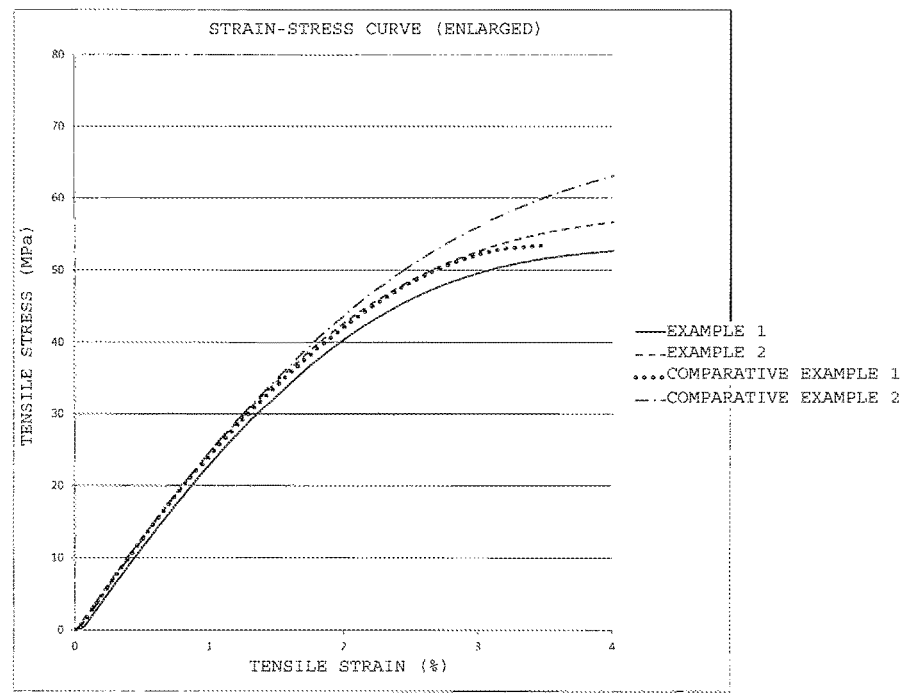

COPOLYMER, AND MOLDED ARTICLE

TECHNICAL FIELD

The present invention relates to a break-resistant copolymer having high transparency and heat resistance and also having a high tensile strain at break without containing rubber, and a molded article containing such a copolymer.

BACKGROUND ART

In general, methacrylic resins, which are excellent in optical properties (e.g., transparency) and weather resistance, have traditionally been used in various applications including lighting fixtures, displaying elements used in signboards and other devices, optical elements used in displays and other devices, interior decoration elements, building components, electronic and electric parts, and medical devices. These applications often require, in addition to optical properties and weather resistance, mechanical properties such as flexibility, flex resistance, shock resistance, and pliability.

To improve these mechanical properties, methacrylic resin compositions made of a methacrylic resin and various other resins have been proposed. For example, it has been proposed to blend a methacrylic resin with multi-layered acrylic rubber particles produced by emulsion polymerization (Patent Document 1). Furthermore, for example, methacrylic resin compositions made of a methacrylic resin and a block copolymer having a methacrylic ester polymer block and an acrylic ester polymer block are known (Patent Documents 2 and 3).

Adding such various other resins may lead to low transparency due to poor dispersion and, in the cases of films and sheets, may lead to dimpling defects to cause poor appearances. To completely solve these problems, it is necessary to develop the ultimate method for improving mechanical properties such as flexibility, flex resistance, shock resistance, and pliability without adding any other resin.

PRIOR ART DOCUMENTS

Patent Documents

Patent Document 1: Japanese Examined Patent Application Publication No. 59-36645
Patent Document 2: WO 2010/055798 A
Patent Document 3: WO 2012/057079 A
Patent Document 4: Japanese Unexamined Patent Application Publication No. 11-228633

Non-Patent Document

Non-Patent Document 1: Polymer Journal 2007, Vol. 39, No. 2, pp. 163-174

SUMMARY OF THE INVENTION

Problems to be Solved by the Invention

It is an object of the present invention is to provide a break-resistant copolymer having high transparency and heat resistance and also having a high tensile strain at break without containing any other resin, and to provide a molded article containing such a copolymer.

Means for Solving the Problems

The inventors conducted various researches to achieve the above object to discover that introducing ester structural units derived from a cyclic ketene acetal monomer into structural units derived from a methacrylic ester monomer can provide break resistance without significantly reducing high transparency and rigidity intrinsic to methacrylic resins.

Thus, the present invention provides the following aspects.

1. A copolymer containing 80% by mass to 98% by mass of structural units derived from a methacrylic ester monomer, and 2% to 10% by mass of ester structural units derived from a cyclic ketene acetal monomer, the copolymer having a weight average molecular weight of 80,000 or more and a molecular weight distribution of 1.75 to 3.80.
2. The copolymer according to 1, wherein a polymer resulting from methanolysis of the ester structural units in the copolymer has a molecular weight distribution of 2.0 or less.
3. The copolymer according to 1 or 2, wherein the methacrylic ester monomer is methyl methacrylate.
4. A molded article containing the copolymer according to any one of 1 to 3.
5. A light guide film made of the molded article according to 4.
6. A decorative film made of the molded article according to 4.
7. A polarizer protective film made of the molded article according to 4.

Effects of the Invention

The copolymer of the present invention is a break-resistant copolymer having high transparency and heat resistance and also having a high tensile strain at break without containing any other resin. Also, a molded article containing such a copolymer and less likely to have a poor appearance can be provided.

BRIEF DESCRIPTION OF THE DRAWING

FIG. 1 is a graph illustrating tensile test results (Strain-Stress curves) of Examples 1 and 2 and Comparative Examples 1 and 2; and
FIG. 2 is a graph illustrating the Strain-Stress curves of Examples 1 and 2 and Comparative Examples 1 and 2 enlarged at strains of from 0% to 4%.

MODE FOR CARRYING OUT THE INVENTION

The copolymer of the present invention contains structural units derived from a methacrylic ester monomer and ester structural units derived from a cyclic ketene acetal monomer.

Although copolymers of methacrylic ester monomers and cyclic ketene acetal monomers have been previously known (Patent Document 4, Non-Patent Document 1), those having improved biodegradability and an effect comparable to those of the present invention have not been achieved. Moreover, it has been unknown that flex resistance and pliability, the effects of the present invention, can be provided, and no requirement or suggestion has been presented for an optimal copolymer.

The copolymer of the present invention contains the structural units derived from a methacrylic ester in an amount of 80% by mass to 98% by mass based on the mass of the copolymer. The amount of the structural units is more preferably 85% by mass to 97% by mass, particularly preferably 90% by mass to 96% by mass. Examples of methacrylic esters include methacrylic alkyl esters such as methyl methacrylate, ethyl methacrylate, and butyl methacrylate; methacrylic aryl esters such as phenyl methacrylate; methacrylic cycloalkyl esters such as cyclohexyl methacrylate, 2-isobornyl methacrylate, 8-tricyclo[5.2.1.0$^{2,6}$] decanyl methacrylate, 2-norbornyl methacrylate, and 2-adamantyl methacrylate. Methacrylic alkyl esters are preferred, and methyl methacrylate is most preferred.

The copolymer of the present invention contains the ester structural units derived from a cyclic ketene acetal monomer in an amount of 2% to 10% by mass based on the mass of the copolymer. The amount of the structural units is more preferably 3% by mass to 9% by mass, particularly preferably 4% by mass to 8% by mass. The ester structural units derived from a cyclic ketene acetal monomer are formed in such a manner that the cyclic ketene acetal monomer opens its ring system and polymerizes. In other words, the amount of the structural units that are derived from a cyclic ketene acetal monomer and made to have an ester bond through ring-opening polymerization is 2% to 10% by mass based on the mass of the copolymer. As a result of this, structural units each having an ester bond are introduced into the main chain of the copolymer. Specific examples of such cyclic ketene acetal monomers that open their ring systems and polymerize include 2-methylene-1,3-dioxolane, 2-methylene-4-methyl-1,3-dioxolane, 2-methylene-4,5-dimethyl-1,3-dioxolane, 8-methylene-7,9-dioxabicyclo[4.3.0]nonane, 2-methylene-1,3-dioxane, 2-methylene-5-methyl-1,3-dioxane, 2-methylene-5,5-dimethyl-1,3-dioxane, 2-methylene-1,3-dioxolane-5-spirocyclopentane, 2-methylene-1,3-dioxolane-5-spirocyclohexane, 2-methylene-1,3-dioxepane, 2-methylene-1,3-dioxocane, 2-methylene-4-phenyl-1,3-dioxolane, 4,7-dimethyl-2-methylene-1,3-dioxepane, 5,6-benzo-2-methylene-1,3-dioxepane, and 2-methylene-1,3,6-trioxocane. Of these, 2-methylene-1,3-dioxepane is particularly preferred in terms of good stretchability of copolymers to be obtained, and high storage stability and high susceptibility to ring-opening polymerization of the cyclic ketene acetal monomer. To introduce ester structures in an amount necessary to exhibit stretchability, the degree of ring opening of the structures derived from a cyclic ketene acetal monomer in the copolymer is preferably 50% or more, more preferably 70% or more, and most preferably 100%.

The copolymer of the present invention may have any other structural units derived from a radically polymerizable monomer (hereinafter also referred to as a radically polymerizable monomer (A)) in addition to the methacrylic ester monomer and the cyclic ketene acetal monomer. Examples of the radically polymerizable monomer (A) include vinyl aromatic hydrocarbons such as styrene, α-methylstyrene, p-methylstyrene, and m-methylstyrene; vinyl alicyclic hydrocarbons such as vinylcyclohexane, vinyl cyclopentane, vinylcyclohexene, vinylcycloheptane, vinylcycloheptene, and vinylnorbornene; ethylenically unsaturated carboxylic acids such as maleic anhydride, maleic acid, and itaconic acid; olefins such as ethylene, propylene, 1-butene, isobutylene, and 1-octene; conjugated dienes such as butadiene, isoprene, and myrcene; acrylamide, methacrylamide, acrylonitrile, methacrylonitrile, vinyl acetate, vinyl ketone, vinyl chloride, vinylidene chloride, and vinylidene fluoride; acrylic alkyl esters such as methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, and dodecyl acrylate; acrylic acid derivatives such as 2-hydroxyethyl acrylate, 2-ethoxyethyl acrylate, glycidyl acrylate, allyl acrylate, and benzyl acrylate; ethylenically unsaturated heterocyclic compounds such as 2-vinylfuran, 2-isopropenylfuran, 2-vinylbenzofuran, 2-isopropenylbenzofuran, 2-vinyldibenzofuran, 2-vinylthiophene, 2-isopropenylthiophene, 2-vinyldibenzothiophene, 2-vinylpyrrole, N-vinylindole, N-vinylcarbazole, 2-vinyloxazole, 2-isopropenyloxazole, 2-vinylbenzoxazole, 3-vinylisooxazole, 3-isopropenylisooxazole, 2-vinylthiazole, 2-vinylimidazole, 4(5)-vinylimidazole, N-vinylimidazole, N-vinylimidazoline, 2-vinylbenzimidazole, 5(6)-vinylbenzimidazole, 5-isopropenylpyrazole, 2-isopropenyl 1,3,4-oxadiazole, vinyltetrazole, 2-vinylpyridine, 4-vinylpyridine, 2-isopropenylpyridine, 3-vinylpyridine, 3-isopropenylpyridine, 2-isopropenylquinoline, 4-vinylquinoline, 4-vinylpyrimidine, 2,4-dimethyl-6-vinyl-S-triazine, 3-methylidenedihydrofuran-2(3H)-one, 4-methyl-3-methylidenedihydrofuran-2(3H)-one, and 4-decyl-3-methylidenedihydrofuran-2(3H)-one; and phosphoric esters having ethylenically unsaturated groups such as dimethyl methacryloyloxymethyl phosphate and 2-methacryloyloxy-1-methyl ethyl phosphate.

The amount of the structural units derived from the radically polymerizable monomer (A) in the copolymer of the present invention, in terms of the balance of stretchability, heat resistance, and water absorption, is preferably 15% by mass or less, more preferably 10% by mass or less, and still more preferably 5% by mass or less, based on the mass of the copolymer.

The copolymer of the present invention, as compared with usual methacrylic ester polymers, exhibits stretchability because ester structural units which tend to cause molecular chains in the copolymer to be entangled with each other are introduced into the main chain. Thus, it is important that the weight average molecular weight, a factor having an influence on the tendency of molecular chains in the copolymer to be entangled with each other, should be large to some degree. The weight average molecular weight is 80,000 or greater, preferably 80,000 to 2,000,000, more preferably 90,000 to 1,000,000, still more preferably 100,000 to 700,000, and particularly preferably 120,000 to 500,000. An excessively small weight average molecular weight leads to reduced entanglement, resulting in poor stretchability of the copolymer. An excessively high weight average molecular weight leads to difficulty in molding.

The weight average molecular weight can be controlled by adjusting factors such as the type and amount of polymerization initiator and chain transfer agent in a polymerization reaction for synthesizing the copolymer.

In the copolymer of the present invention, the ratio of weight average molecular weight to number average molecular weight (this ratio is hereinafter referred to as "molecular weight distribution") is preferably 1.75 to 3.80, more preferably 1.80 to 3.50, and still more preferably 1.90 to 3.20. An excessively narrow molecular weight distribution generally means a small ratio of high-molecular-weight species and low-molecular-weight species. A small ratio of high-molecular-weight species leads to significantly reduced stretchability, whereas a small ratio of low-molecular-weight species leads to reduced moldability. An excessively wide molecular weight distribution means an increased ratio of low-molecular-weight species, which tends to result in reductions in stretchability and chemical resistance. The values of weight average molecular weight and molecular weight distribution are determined by gel permeation chromatography (GPC) and calculated in terms of standard polystyrene.

The weight average molecular weight and the molecular weight distribution can be controlled by adjusting factors such as the type and amount of polymerization initiator and chain transfer agent in a polymerization reaction. Purification processes such as reprecipitation by which low-molecular-weight species are removed are not preferred because the molecular weight distribution may be smaller than 1.80.

The GPC measurement is performed as described below. Tetrahydrofuran is used as an eluent, and two TSKgel SuperMultipore HZM-M columns and a SuperHZ4000 column (Tosoh Corporation) connected in series are used as columns. An HLC-8320 Model (Tosoh Corporation) equipped with a differential refractive index detector (RI detector) was used as a detector. A solution of 4 mg of a methacrylic resin in 5 ml of tetrahydrofuran was used as a sample. The temperature of a column oven was set at 40° C., and 20 μl of the sample solution was injected at an eluent flow rate of 0.35 ml/min to obtain a chromatogram.

Standard polystyrenes having a molecular weight in the range of 5,000,000 to 400 were subjected to the measurement, and a calibration curve showing a relationship between retention time and molecular weight was prepared. In the chromatogram, a line connecting a point where the inclination on the high-molecular-weight side turns from zero to positive with a point where the inclination of the peak on the low-molecular-weight side turns from negative to zero was used as a baseline. In the case where the chromatogram has more than one peak, a line connecting a point where the inclination of the peak nearest to the high-molecular-weight side turns from zero to positive with a point where the inclination of the peak nearest to the low-molecular-weight side turns from negative to zero was used as a baseline.

The glass transition temperature of the copolymer of the present invention is preferably 70 to 180° C., more preferably 80 to 180° C., still more preferably 80 to 120° C., and yet more preferably 85 to 120° C. An excessively low glass transition temperature leads to a copolymer with poor heat resistance, resulting in limited use. An excessively high glass transition temperature leads to a brittle and fragile copolymer, which can hardly produce the effects of the present invention. The glass transition temperature was measured in accordance with JIS K7121. Specifically, the copolymer of the present invention was subjected to differential scanning calorimetry where the copolymer was once heated to 230° C., cooled to room temperature, and then heated from room temperature to 230° C. at a rate of 10° C./min, whereby a DSC curve was obtained. A midpoint glass transition temperature determined from the DSC curve during the second heating was used as a glass transition temperature in the present invention.

The ester structural units introduced into the main chain of the copolymer of the present invention can be cleaved by methanolysis. From the number average molecular weight of a polymer resulting from methanolysis, the molar ratio of the ester structural units introduced into the main chain of the copolymer of the present invention can be determined. From the molecular weight distribution of the polymer resulting from methanolysis, how uniformly the ester structural units have been introduced into the main chain of the copolymer can be determined. As used herein, the term "polymer resulting from methanolysis" refers to a polymer or copolymer produced by methanolysis. One example is a polymer composed of a methacrylic ester alone. For example, when the copolymer before methanolysis contains structural units derived from the radically polymerizable monomer (A), what is produced by methanolysis will be a copolymer composed of the structural units derived from a methacrylic acrylic ester monomer and the structural units derived from the radically polymerizable monomer (A). Such a copolymer can also be referred to as a polymer resulting from methanolysis. Narrower molecular weight distributions of the polymer resulting from methanolysis indicate that more uniformly the cyclic ketene acetal monomer has been copolymerized. In the present invention, a narrower molecular weight distribution of the polymer resulting from methanolysis, i.e., more uniform introduction of the ester structural units into the copolymer main chain leads to higher entanglement of copolymers, leading to higher stretchability. The molecular weight distribution of the polymer resulting from methanolysis is preferably 2.0 or less, more preferably 1.90 or less, and still more preferably 1.75 or less.

The copolymer of the present invention may be produced by any method. Typically, in terms of productivity, the copolymer is preferably produced by radical polymerization under selected conditions, e.g., polymerization temperature, polymerization time, type and amount of chain transfer agent, and type and amount of polymerization initiator. The radical polymerization is preferably carried out in the absence or presence of a solvent. To produce a copolymer with a low concentration of impurities, the radical polymerization is preferably carried out in the absence of a solvent. To inhibit silvering and coloring of molded articles, the polymerization reaction is preferably carried out at a low dissolved oxygen concentration. The polymerization reaction is preferably carried out in an atmosphere of inert gas such as nitrogen gas.

The polymerization initiator used in the radical polymerization for producing the copolymer of the present invention may be any initiator that generates reactive radicals. Examples include t-hexyl peroxy isopropyl monocarbonate, t-hexyl peroxy 2-ethylhexanoate, 1,1,3,3-tetramethylbutyl peroxy 2-ethylhexanoate, t-butyl peroxy pivalate, t-hexyl peroxy pivalate, t-butyl peroxy neodecanoate, t-hexyl peroxy neodecanoate, 1,1,3,3-tetramethylbutyl peroxy neodecanoate, 1,1-bis(t-hexyl peroxy)cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), and dimethyl 2,2'-azobis(2-methyl propionate). Of these, t-hexyl peroxy 2-ethylhexanoate, 1,1-bis(t-hexyl peroxy)cyclohexane, and dimethyl 2,2'-azobis(2-methyl propionate) are preferred.

Such a polymerization initiator preferably has a one-hour half-life temperature of 60 to 140° C., more preferably 80 to 120° C. The polymerization initiator used to produce the copolymer preferably has a hydrogen abstraction ability of 20% or less, more preferably 10% or less, and still more preferably 5% or less. Such polymerization initiators can be used alone or in combination. The amount of polymerization initiator is preferably 0.0001 to 0.02 part by mass, more preferably 0.001 to 0.01 part by mass, and still more preferably 0.005 to 0.007 part by mass, based on 100 parts by mass of monomers subjected to polymerization reaction.

The hydrogen abstraction ability can be determined, for example, from technical data of polymerization initiator manufacturers (e.g., NOF Corporation technical data "Hydrogen Abstraction Ability and Initiator Efficiency of Organic Peroxide", written in April 2003). Alternatively, the hydrogen abstraction ability can be determined by a radical trapping method using α-methylstyrene dimers, i.e., α-methylstyrene dimer trapping method. This measurement is typically carried out as described below. First, in the presence of α-methylstyrene dimers serving as radical trapping agents, a polymerization initiator is cleaved to form radical fragments. Among the radical fragments formed, radical fragments having low hydrogen abstraction ability are added to and captured by the double bonds of the α-methylstyrene dimers, whereas radical fragments having high hydrogen abstraction ability abstract hydrogen from cyclohexanes to generate cyclohexyl radicals. The cyclohexyl radicals are added to and captured by the double bonds of the α-methylstyrene dimers to form cyclohexane-captured products. Thus, the hydrogen abstraction ability is defined as the ratio (the molar fraction) of radical fragments having high hydrogen abstraction ability to the theoretical amount of radical fragment generation, as determined by quantification of cyclohexanes or the cyclohexane-captured products.

Examples of the chain transfer agent used in the radical polymerization for producing the copolymer of the present invention include alkyl mercaptans such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropanetris-(β-thiopropionate), and pentaerythritol tetrakisthiopropionate. Of these, monofunctional alkyl mercaptans such as n-octyl mercaptan and n-dodecyl mercaptan are preferred. These chain transfer agents can be used alone or in combination.

The amount of chain transfer agent is preferably 0.1 to 1 part by mass, more preferably 0.15 to 0.8 part by mass, still more preferably 0.2 to 0.6 part by mass, and most preferably 0.2 to 0.5 part by mass, based on 100 parts by mass of monomers subjected to polymerization reaction. The amount of chain transfer agent is preferably 2,500 to 10,000 parts by mass, more preferably 3,000 to 9,000 parts by mass, and still more preferably 3500 to 6,000 parts by mass, based on 100 parts by mass of the polymerization initiator. A chain transfer agent in an amount in the above ranges tends to provide a copolymer having good molding processability and high mechanical strength.

The solvent used in the radical polymerization for producing the copolymer of the present invention may be any solvent that dissolves monomers and copolymers. Aromatic hydrocarbons such as benzene, toluene, and ethylbenzene are preferred. These solvents can be used alone or in combination. The amount of solvent can be selected as appropriate in view of reaction solution viscosity and productivity. For example, the amount of solvent is preferably 100 parts by mass or less, more preferably 90 parts by mass or less, based on 100 parts by mass of polymerization reactant.

The temperature during polymerization reaction in the radical polymerization for producing the copolymer of the present invention is preferably 100 to 200° C., more preferably 110 to 180° C. A polymerization temperature of 100° C. or higher tends to increase the polymerization rate and reduce the viscosity of polymerization solution, leading to improved productivity. A polymerization temperature of 200° C. or lower allows the polymerization rate to be easily controlled and inhibits the formation of by-products, as a result of which coloring of the copolymer of the present invention can be inhibited. The time of the polymerization reaction is preferably 0.5 to 4 hours, more preferably 1.5 to 3.5 hours, and still more preferably 1.5 to 3 hours. In the case of a continuous-feed reactor, the time of the polymerization reaction an average residence time in the reactor. If the temperature during the polymerization reaction and the time of the polymerization reaction are in the above ranges, highly transparent copolymers can be produced with high efficiency.

The degree of polymerization conversion in the radical polymerization for producing the copolymer of the present invention is preferably 20% to 80% by mass, more preferably 30% to 70% by mass, and still more preferably 35% to 65% by mass. A degree of polymerization conversion of 20% by mass or more tends to facilitate the removal of residual unreacted monomers, providing a molded article of the copolymer with a good appearance. A degree of polymerization conversion of 70% by mass or less tends to reduce the viscosity of polymerization solution, leading to improved productivity.

Although the radical polymerization may be carried out using a batch reactor, preferably, it is carried out using a continuous-feed reactor in terms of productivity and stretchability of a copolymer to be obtained. In a continuous-feed reaction, a polymerization reactant (a mixture of monomers (i.e., the methacrylic ester monomer, the cyclic ketene acetal monomer, and the radically polymerizable monomer (A)), one or more polymerization initiators, one or more chain transfer agents, and other components) is prepared, for example, in a nitrogen atmosphere, and the reactant is fed into a reactor at a constant flow rate, while the solution in the reactor is discharged at a flow rate equivalent to the feed rate. The reactor may be a tube reactor, which can create near plug flow conditions, and/or a tank reactor, which can create near-completely mixed conditions. The continuous-feed polymerization may be carried out using one reactor or two or more connected reactors.

In the present invention, it is preferable to use at least one continuous-feed tank reactor. The amount of solution in the tank reactor during the polymerization reaction is preferably ¼ to ¾, more preferably ⅓ to ⅔, of the volume of the tank reactor. The reactor is typically equipped with a stirrer. Examples of stirrers include static stirrers and dynamic stirrers. Examples of dynamic stirrers include Maxblend stirrers, stirrers having grid-like blades that rotate around a rotating vertical shaft disposed at the center, propeller stirrers, and screw stirrers. Of these, Maxblend stirrers are suitable for use in terms of uniform mixing.

After completion of the polymerization, volatile components such as unreacted monomers are removed as required. The volatile components are preferably, but not necessarily, removed by heat devolatilization. Examples of the method of devolatilization include equilibrium flash vaporization and adiabatic flash vaporization. The devolatilization temperature in adiabatic flash vaporization is preferably 200 to 280° C., more preferably 220 to 260° C. The time to heat a resin in adiabatic flash vaporization is preferably 0.3 to 5 minutes, more preferably 0.4 to 3 minutes, and still more preferably 0.5 to 2 minutes. Devolatilization at such a temperature for such a heating time tends to provide a less colored copolymer. The removed unreacted monomers can be recovered and reused for the polymerization reaction. The recovered monomers may have increased yellow indices due to the heat applied during the recovery and other operations. Thus, the recovered monomers are preferably purified in an appropriate manner to decrease their yellow indices.

In producing the molded article of the present invention, the copolymer of the present invention may be mixed with any other polymers without adversely affecting the effects of the present invention. Examples of such other polymers include polyolefin resins such as polyethylene, polypropylene, polybutene-1, poly-4-methylpentene-1, and polynorbornene; ethylene ionomers; styrene resins such as polystyrene, styrene-maleic anhydride copolymers, high-impact polystyrene, AS resins, ABS resins, AES resins, AAS resins, ACS resins, and MBS resins; methyl methacrylate polymers, methyl methacrylate-styrene copolymers; polyester resins such as polyethylene terephthalate and polybutylene terephthalate; polyamides such as nylon 6, nylon 66, and polyamide elastomers; polycarbonate, polyvinyl chloride, polyvinylidene chloride, polyvinyl alcohols, ethylene-vinyl alcohol copolymers, polyacetal, polyvinylidene fluoride, polyurethane, modified-polyphenylene ethers, polyphenylene sulfide, silicone-modified resins; acrylic rubber, acrylic thermoplastic elastomers, silicone rubber; styrene thermoplastic elastomers such as SEPS, SEBS, and SIS; and olefin rubbers such as IR, EPR, and EPDM.

The molded article of the present invention preferably contains the copolymer of the present invention in an amount of 80% by mass or more, more preferably 90% by mass or more. The molded article of the present invention may be produced by any method. For example, the copolymer of the present invention or a molding material containing the copolymer of the present invention may be molded by solution casting or melt molding such as T-die molding (e.g., lamination and coextrusion), inflation molding (e.g., coextrusion), compression molding, blow molding, calender molding, vacuum molding, or injection molding (e.g., insert molding, coinjection molding, press molding, core-back molding, and sandwich molding). Of these, T-die molding, inflation molding, and injection molding are preferred in terms of high productivity, cost, and other factors.

The copolymer of the present invention can be formed into pellets or other forms for convenience in storage, transportation, or molding. In producing the molded article of the present invention, molding may be carried out for several times. For example, after the copolymer of the present invention is molded into a pelletized molded article, the pelletized molded article can be further molded into a molded article of the desired shape.

In the present invention, various additives may optionally be added to the copolymer, such as antioxidants, thermal degradation inhibitors, UV absorbers, light stabilizers, lubricants, release agents, polymer processing aids, antistatic agents, flame retardants, dyes, pigments, light-diffusing agents, organic coloring agents, delusterants, and fluorescence substances. The amount of these various additives can be appropriately determined without adversely affecting the effects of the present invention. The total amount of the additives is preferably 7% by mass or less, more preferably 5% by mass or less, and still more preferably 4% by mass or less.

The various additives may be added to a polymerization reaction solution during the production of a copolymer, may be added to a copolymer formed by polymerization reaction, or may be added during the production of a molded article.

Antioxidants, by themselves, help prevent oxidation degradation of resins in the presence of oxygen. Examples include phosphorus antioxidants, hindered phenol antioxidants, and thioether antioxidants. These antioxidants may be used alone or in combination. Among these antioxidants, phosphorus antioxidants and hindered phenol antioxidants are preferred in terms of prevention of the decrease in optical properties due to coloring. A combined use of a phosphorus antioxidant and a hindered phenol antioxidant is more preferred.

When a phosphorus antioxidant and a hindered phenol antioxidant are used in combination, the mass ratio of the amount of phosphorus antioxidant to the amount of hindered phenol antioxidant is preferably 1:5 to 2:1, more preferably 1:2 to 1:1.

Examples of suitable phosphorus antioxidants include 2,2-methylenebis 4,6-di-t-butylphenyl)octyl phosphite (available from ADEKA under the trade name ADK STAB HP-10), tris(2,4-di-t-butylphenyl) phosphite (available from BASF under the trade name IRGAFOS 168), and 3,9-bis(2, 6-di-t-butyl-4-methylphenoxy)-2,4,8,10-tetraoxa-3,9-diphosphorspiro[5.5]undecane (available from ADEKA under the trade name ADK STAB PEP-36).

Examples of suitable hindered phenol antioxidant include pentaerythrityl-tetrakis[3-(3,5-di-t-butyl-4-hydroxyphenyl) propionate] (available from BASF under the trade name IRGANOX 1010) and octadecyl-3-(3,5-di-t-butyl-4-hydroxyphenyl) propionate (available from BASF under the trade name IRGANOX 1076).

Thermal degradation inhibitors are able to inhibit thermal degradation of a resin by capturing polymer radicals generated when the resin is exposed to a high temperature under conditions substantially free of oxygen.

Examples of suitable thermal degradation inhibitors include 2-t-butyl-6-(3'-butyl-5'-methyl-hydroxybenzyl)-4-methylphen yl acrylate (available from Sumitomo Chemical Co., Ltd. under the trade name SUMILIZER GM) and 2,4-di-t-amyl-6-(3',5'-di-t-amyl-2'-hydroxy-α-methylbenzyl)phenyl acrylate (available from Sumitomo Chemical Co., Ltd. under the trade name SUMILIZER GS).

UV absorbers are compounds having the ability to absorb ultraviolet radiation and said to have a main function to convert light energy to thermal energy.

Examples of UV absorbers include benzophenones, benzotriazoles, triazines, benzoates, salicylates, cyanoacrylates, oxalic acid anilides, malonic esters, and formamidines. These may be used alone or in combination.

Benzotriazoles, which are highly effective in reducing the decrease in optical properties, such as coloring due to ultraviolet irradiation, are suitable as UV absorbers used when the film of the present invention is used in optical applications. Examples of suitable benzotriazoles include 2-(2H-benzotriazol-2-yl)-4-(1,1,3,3-tetramethylbutyl) phenol (available from BASF under the trade name TINUVIN 329), 2-(2H-benzotriazol-2-yl)-4,6-bis(1-methyl-1-phenylethyl) phenol (available from BASF under the trade name TINUVIN 234), 2,2'-methylenebis[6-(2H-benzotriazol-2-yl)-4-t-octylphenol] (LA-31 available from ADEKA), and 2-(5-octylthio-2H-benzotriazol-2-yl)-6-tert-butyl-4-methylphenol.

Examples of triazine UV absorbers include 2,4,6-tris(2-hydroxy-4-hexyloxy-3-methylphenyl)-1,3,5-triazine (LA-F70 available from ADEKA), analogs thereof, such as hydroxyphenyltriazine UV absorbers (TINUVIN 477 and TINUVIN 460 available from BASF), and 2,4-diphenyl-6-(2-hydroxy-4-hexyloxyphenyl)-1,3,5-triazine.

To absorb light with a wavelength of 380 to 400 nm with particularly high efficiency, it is preferable to use, as a UV absorber, a metal complex having a ligand with a heterocyclic structure, as disclosed, for example, in WO 2011/089794, WO 2012/124395, Japanese Unexamined Patent Application Publication No. 2012-012476, Japanese Unexamined Patent Application Publication No. 2013-023461, Japanese Unexamined Patent Application Publication No. 2013-112790, Japanese Unexamined Patent Application Publication No. 2013-194037, Japanese Unexamined Patent Application Publication No. 2014-62228, Japanese Unexamined Patent Application Publication No. 2014-88542, and Japanese Unexamined Patent Application Publication No. 2014-88543.

Light stabilizers are compounds said to have a main function to capture radicals generated by photooxidation.

Examples of suitable light stabilizers include hindered amines such as compounds having 2,2,6,6-tetraalkylpiperidine backbones.

Examples of lubricants include stearic acid, behenic acid, stearoamidic acid, methylenebis stearamide, hydroxy stearic acid triglyceride, paraffin wax, ketone wax, octyl alcohol, and hardened oil.

Examples of release agents include higher alcohols such as cetyl alcohol and stearyl alcohol; and higher fatty acid esters of glycerol, such as stearic acid monoglyceride and stearic acid diglyceride. In the present invention, it is preferable to use, as a release agent, a higher alcohol and a fatty acid monoester of glycerol in combination. The higher alcohol and the fatty acid monoester of glycerol, when used in combination, may be used in any ratio. The mass ratio of the amount of higher alcohol to the amount of fatty acid monoester of glycerol is preferably 2.5:1 to 3.5:1, more preferably 2.8:1 to 3.2:1.

Polymer processing aids typically used are polymer particles having a particle size of 0.05 to 0.5 μm, which can be produced by emulsion polymerization. The polymer particles may be monolayer particles composed of a polymer composed of a single component and having a single limiting viscosity or may be multilayer particles composed of two or more polymers composed of different components and having different limiting viscosities. Particularly preferred are two-layered particles having, as an inner layer, a polymer layer with a low limiting viscosity and, as an outer layer, a polymer layer with a high limiting viscosity of 5 dl/g or more. The polymer processing aid preferably has a limiting viscosity of 3 to 6 dl/g. An excessively low limiting viscosity tends to result in little improvement in moldability. An excessively high limiting viscosity tends to cause a reduction in molding processability of the copolymer.

Organic coloring agents suitable for use are compounds having a function to convert ultraviolet radiation to visible radiation.

Examples of light-diffusing agents and delusterants include glass microparticles, crosslinked polysiloxane microparticles, crosslinked polymer microparticles, talc, calcium carbonate, and barium sulfate.

Examples of fluorescence substances include fluorescent pigments, fluorescent dyes, fluorescent whiteners, fluorescent brighteners, and fluorescent bleaches.

A film, one aspect of the molded article of the present invention, can be produced by solution casting, melt casting, extrusion molding, inflation molding, blow molding, and other methods. Of these, extrusion molding is preferred because it provides a film having high transparency and improved toughness, easy to handle, and having a good balance of toughness, surface hardness, and rigidity. The temperature of a copolymer extruded through an extruder is set preferably at 160 to 270° C., more preferably at 220 to 260° C. In general, films are planar molded articles having a thickness of 0005 mm to 0.25 mm.

Among extrusion molding methods, a method is preferred that includes extruding the copolymer of the present invention or a molding material containing the copolymer of the present invention in a molten state through a T-die, and then molding the extrudate by passing it through between two or more mirror-finished rolls or mirror-finished belts. This method provides a film with good surface smoothness, good specular gloss, and low haze. The mirror-finished rolls or mirror-finished belts are preferably made of metal. The linear pressure between the pair of mirror-finished rolls or mirror-finished belts is preferably 10 N/mm or more, more preferably 30 N/mm or more.

Both of the mirror-finished rolls or mirror-finished belts preferably have surface temperatures of 130° C. or lower. At least one of the pair of mirror-finished rolls or mirror-finished belts preferably has a surface temperature of 60° C. or higher. At such surface temperatures, the copolymer of the present invention or a molding material containing the copolymer of the present invention extruded through an extruder can be cooled faster than by natural cooling, and a film with excellent surface smoothness and low haze can be readily produced. The thickness of an unstretched film obtained by extrusion molding is preferably 10 to 300 μm. The haze of the film, ire the case of a thickness of 100 μm, is preferably 0.5% or less, more preferably 3% or less.

The molded article of the present invention that has been molded into a film may subjected to stretching. Through the stretching, a film having enhanced mechanical strength and resistant to cracking can be obtained. Examples of stretching methods include, but are not limited to, simultaneous biaxial stretching, sequential biaxial stretching, and tubular stretching. The temperature during the stretching is at least 10° C. higher than the glass transit ion temperature of the copolymer and up to 40° C. higher than the glass transition temperature of the copolymer. In such a temperature range, uniform stretching can be achieved, and a film with high strength can be produced. The stretching is typically carried out at 100 to 5,000%/min. After the stretching, the film can be heat fixed to provide a film less prone to heat shrinkage. The thickness of the stretched film preferably 10 to 200 μm.

The copolymer and the molded article of the present invention, which are break-resistant for their stretchabilities and have high transparency and heat resistance, are suitable for optical applications, in particular, polarizer protective films, liquid crystal protective films, surface materials of portable terminals, display window protective films of portable terminals, light guide films, and front plates of various displays. Furthermore, the copolymer and the molded article of the present invention, which have good weather resistance and are break-resistant, are suitable for other applications, for example, decorative films, automobile interiors, furnishings, door materials, and construction materials such as foot stalls.

EXAMPLES

The present invention will now be described in more detail with reference to examples and comparative examples, but these examples are not intended to limit the present invention. Property values were measured by the following methods.

Weight Average Molecular Weight, Number Average Molecular Weight, Molecular Weight Distribution Tetrahydrofuran was used as an eluent, and two TSKgel SuperMultipore HZM-M columns and a SuperHZ4000 column (Tosoh Corporation) connected in series were used as columns. An HLC-8320 Model (Tosoh Corporation) equipped with a differential refractive index detector (RI detector) was used as a GPC apparatus. A polymer, copolymer, or polymer composition (a measuring object) in an amount of 4 mg was dissolved in 5 ml of tetrahydrofuran to prepare a sample solution. The temperature of a column oven was set at 40° C., and 20 μl of the sample solution was injected at an eluent flow rate of 0.35 ml/min to obtain a chromatogram. Ten standard polystyrenes having a molecular weight in the range of 400 to 5,000,000 were subjected to the GPC measurement, and a calibration curve showing the relationship between retention time and molecular weight was prepared. Based on the calibration curve, the weight average molecular weight (Mw) and the number average molecular weight (Mn) were determined, and the molecular weight distribution (Mw/Mn) was determined.

Methanolysis

A polymer, copolymer, or polymer composition in an amount of 0.5 part by mass was dissolved in 15 parts by mass of benzene. To the resulting solution, 10 parts by mass of a 0.5 N solution of potassium methoxide in methanol was added, and then the resulting mixture was stirred at 23° C. for 12 hours. After the solution was washed with ion-exchanged water, a supernatant was dried well to give a methanolyzed polymer. The number average molecular weight and the molecular weight distribution of the methanolyzed polymer were determined by GPC.

Glass Transition Temperature

A polymer, copolymer, or polymer composition was once heated to 230° C., cooled to room temperature, and then heated from room temperature to 230° C. at a rate of 10° C./min using a differential scanning calorimeter (DSC-50 Model available from Shimadzu Corporation) in accordance with JIS K7121, whereby a DSC curve was obtained. A midpoint glass transition temperature determined from the DSC curve during the second heating was used as a glass transition temperature in the present invention.

Total Light Transmittance

A polymer, copolymer, or polymer composition was hot-press molded at 230° C. to give a test piece (A) of 50 mm×50 mm×3.2 mm (thickness). In accordance with JIS K7361-1, the total light transmittance of the test piece (A) was measured using a haze meter (HM-150 available from Murakami Color Research Laboratory Co., Ltd).

Haze

The haze of the test piece (A) that had been subjected to total light transmittance measurement was measured in accordance with JIS K7136 using a haze meter (HM-150 available from Murakami Color Research Laboratory Co., Ltd).

Tensile Modulus, Tensile Strain at Break

A polymer or copolymer was hot-press molded at 230° C. to give a test piece of 120 mm×50 mm×0.4 mm (thickness). The test piece was cut to a size of 90 mm×10 mm, and its cross-section was polished with #1500 sandpaper. The cut test piece was placed on a tensile tester (Autograph AG-IS 5 kN available from Shimadzu Corporation) set at a chuck distance of 70 mm. A tensile test was performed at a tensile speed of 5 mm/min to measure the tensile stress and the tensile strain (Strain-Stress curve). From this measurement, a tensile modulus and a tensile strain at break were calculated. Whether or not the test piece yielded, the strain at a point where breakage occurred was used as a tensile strain at break.

$^1$H-NMR Measurement

For determination of structures of cyclic ketene acetal monomers synthesized in Synthesis Examples described below and intermediates thereof, and for determination of copolymerization compositions and degrees of ring opening of copolymers of Examples and Comparative Examples, $^1$H-NMR was used. $^1$H-NMR spectra were determined with a nuclear magnetic resonance apparatus (ULTRA SHIELD 400 PLUS available from Bruker) at room temperature with 64 scans using deuterated chloroform as a deuterated solvent in an amount of 1 mL per 10 mg of a sample to be analyzed.

Pencil Hardness

A polymer, copolymer, or polymer composition was hot-press molded at 230° C. to give a test piece of 50 mm×50 mm×3.2 mm (thickness). The pencil hardness of the test piece was measured in accordance with JIS K5600-5-4 under a load of 0.75 Kg.

Synthesis Example 1

Synthesis of 2-Chloromethyl-1,3-Dioxepane (i)

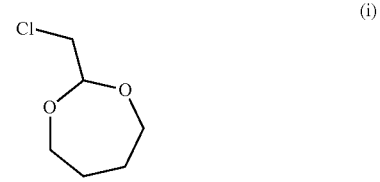

(i)

Into a 500 mL four-necked flask equipped with a thermometer, a stirrer, and Claisen simple distiller, 250.0 g (2.0 mol) of chloroacetaldehyde dimethyl acetal, 180.9 g (2.0 mol) of 1,4-butanediol, and 2.5 g of Dowex50WX8 (registered trademark, Dow Chemical) were loaded. The mixture was stirred for 5 hours while the inner temperature was raised to 100 to 110° C. and fractions at overhead temperatures of 70° C. or lower were removed from the distiller. The reaction mixture was cooled to 25° C., and then Dowex50WX8 was filtered off. Hexane (740 g) was added to the filtrate, and then the resulting mixture was washed with 360 g of a 5% by mass sodium hydrogen carbonate solution in water. The resulting organic layer was concentrated under reduced pressure. The concentrate was distilled using a distiller equipped with a 30 cm Vigreux column to give 253.9 g (1.7 mol) of 2-chloromethyl-1,3-dioxepane as a fraction at an overhead temperature of 75 to 76° C./1.5 kPa. The yield was 84.3%.

The fraction obtained (2-chloromethyl-1,3-dioxepane) was subjected to $^1$H-NMR measurement to show the following $^1$H-NMR chart.

$^1$H-NMR (400 MHz, CDCl$_3$, ppm, TMS) δ: 1.75 (4H, m), 3.47 (2H, d, J=5.2 Hz), 3.69 (2H, m), 3.95 (2H, m), 4.85 (1H, t, J=5.2 Hz)

Synthesis Example 2

Synthesis of 2-Methylene-1,3-Dioxepane (7MDO) (ii)

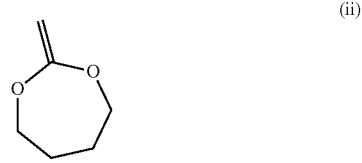

(ii)

Into a 2-liter four-necked flask equipped with a dropping funnel, a thermometer, a stirrer, and a nitrogen inlet tube, 224.4 g (2.0 mol) of potassium-t-butoxide and 700 ml of t-butanol were loaded. Through the dropping funnel, 200.0 g (1.3 mol) of the 2-chloromethyl-1,3-dioxepane synthesized in Synthesis Example 1 was added dropwise at such a speed that the inner temperature could be maintained at 25° C. or lower, and then the resulting mixture was stirred at an inner temperature of 60° C. for 8 hours. The reaction solution was cooled to 25° C. and then suction filtered through 5B filter paper to separate a solid. The filtrate obtained was then concentrated under reduced pressure. The concentrate was distilled using a distiller equipped with a 30 cm Vigreux column to give 99.7 g (0.9 mol) of 2-methylene-1,3-dioxepane (7MDO) as a fraction at an overhead temperature of 40 to 42° C./1.3 kPa. The yield was 65.8%.

The fraction obtained (7MDO) was subjected to $^1$H-NMR measurement to show the following $^1$H-NMR chart.

$^1$H-NMR (400 MHz, CDCl$_3$, ppm, TMS) δ: 1.76 (4H, m), 3.48 (2H, S), 3.94 (4H, m)

Production Example 1 (Production of Emulsion Containing Multi-Layered Polymer Particles (A))

(1) In a glass-lined reaction vessel (100 liters) equipped with a capacitor, a thermometer, and a stirrer, 48 kg of ion-exchanged water was placed, and then 416 g of sodium stearate, 128 g of sodium lauryl sarcosinate, and 16 g of sodium carbonate were placed and dissolved. Thereafter, 11.2 kg of methyl methacrylate and 110 g of allyl methacrylate were placed and heated to 70° C. with stirring, and then 560 g of a 2% potassium persulfate solution in water was added to initiate polymerization. After the polymerization peak, the mixture was maintained at 70° C. over 30 minutes to give an emulsion.

(2) To the emulsion obtained in (1), 720 g of a 2% sodium persulfate solution in water was further added, and then a monomer mixture of 12.4 kg of butyl acrylate, 1.76 kg of styrene, and 280 g of allyl methacrylate was added dropwise over 60 minutes. The resulting mixture was then stirred for 60 minutes to carry out graft polymerization.

(3) To the emulsion after graft polymerization obtained in (2), 320 g of a 2% potassium persulfate solution in water was added, and a monomer mixture of 6.2 kg of methyl methacrylate, 0.2 kg of methyl acrylate, and 200 g of n-octyl mercaptan was further added over 30 minutes. The resulting mixture was then stirred for 60 minutes to complete the polymerization and then cooled to give a polymer emulsion. The emulsion thus obtained (hereinafter referred to as "the emulsion containing multi-layered polymer particles (A)") contained 40% multi-layered polymer particles (A) (three-step polymer) with an average particle size of 0.23 μm.

Production Example 2 (Production of Emulsion Containing (Meth)Acrylic Ester Polymer Particles (B)

In the same reaction vessel as used in Production Example 1.48 kg of ion-exchanged water was placed, and then 252 g of a surfactant ("Pelex SS-H" available from Kao Corporation) was placed and dissolved by stirring. After the resulting mixture was heated to 70° C., 160 g of a 2% potassium persulfate solution in water was added, and then a mixture of 3.04 kg of methyl methacrylate, 0.16 kg of methyl acrylate, and 15.2 g of n-octyl mercaptan was added in one portion to initiate polymerization. After polymerization exotherm was finished, the resulting mixture was stirred for 30 minutes. Thereafter, 160 g of a 2% potassium persulfate solution in water was added, and then a mixture of 27.4 kg of methyl methacrylate, 1.44 kg of methyl acrylate, and 98 g of n-octyl mercaptan was continuously added dropwise over 2 hours to carry out polymerization. After completion of the addition, the resulting mixture was left to stand for 60 minutes and then cooled to give a polymer emulsion containing 40% (meth)acrylic ester polymer particles (B) with an average particle size 0.12 μm. The (meth)acrylic ester polymer particles (B) in the emulsion thus obtained (hereinafter referred to as "the emulsion containing (meth)acrylic ester polymer particles (B)") had a limiting viscosity of 0.44 g/dl.

Example 1

A well-dried pressure container equipped with a stirrer was purged with nitrogen. Into the pressure container, 25 parts by mass of toluene, 19.8 parts by mass of methyl methacrylate, and 5 parts by mass of the 7MDO obtained in Synthesis Example 2 were loaded.

The pressure container was thoroughly purged with nitrogen gas, and then the temperature was raised to 140° C. with stirring. To the pressure container, the whole amount of 0.001 part by mass of di-t-butyl peroxide (PERBUTYL D available from NOF Corporation) dissolved in 1 part by mass of toluene was added to initiate polymerization. Under stirring at 140° C., the whole amount of 0.0005 part by mass of di-t-butyl peroxide (PERBUTYL D available from NOF Corporation) dissolved in 0.5 part by mass of toluene was further added after 1.5 hours and 3 hours from the start of the polymerization. After 4 hours from the start of the polymerization, the mixture was cooled to room temperature to stop the polymerization. The resulting solution was diluted with 25 parts by mass of toluene and then poured into 2,000 parts by mass of methanol to precipitate a solid. The precipitated solid was filtered and dried well to give 12 parts by mass of a copolymer (A1). The copolymer (A1) was analyzed by $^1$H-NMR to show that the content of structural units derived from methyl methacrylate was 92% by mass; the content of structural units derived from the 7MDO was 8.0% by mass; 100% of the 7MDO was polymerized by ring-opening; and the polymer main chain had ester structural units. The copolymer (A1) had a weight average molecular weight (Mw) of 272,000 and a molecular weight distribution (Mw/Mn) of 2.23. The results including other evaluation results are shown in Table 1, FIG. 1, and FIG. 2. A test piece (120 mm×50 mm×0.4 mm (thickness)) was prepared by hot-press molding at 230° C. and folded 180 degrees by hand at room temperature (23° C.) The test piece did not break, and the fold did not whiten.

Example 2

A well-dried pressure container equipped with a stirrer was purged with nitrogen. Into the pressure container, 25 parts by mass of toluene, 21 parts by mass of methyl methacrylate, and 4.1 parts by mass of the 7MDO obtained in Synthesis Example 2 were loaded.

The pressure container was thoroughly purged with nitrogen gas, and then the temperature was raised to 140° C. with stirring. To the pressure container, the whole amount of 0.001 part by mass of di-t-butyl peroxide (PERBUTYL D available from NOF Corporation) dissolved in 1 part by mass of toluene was added to initiate polymerization. Under stirring at 140° C., the whole amount of 0.0005 part by mass of di-t-butyl peroxide (PERBUTYL D available from NOF Corporation) dissolved ire 2.2 parts by mass of methyl methacrylate was further added after 1.5 hours and 3 hours from the start of the polymerization. After 4 hours from the start of the polymerization, the mixture was cooled to room temperature to stop the polymerization. The resulting solution was diluted with 25 parts by mass of toluene and then poured into 2,000 parts by mass of methanol to precipitate a solid. The precipitated solid was filtered and dried well to give 12 parts by mass of a copolymer (A2). The copolymer (A2) was analyzed by $^1$H-NMR to show that the content of structural units derived from methyl methacrylate was 94.8% by mass; the content of structural units derived from the 7MDO was 5.2% by mass; 100% of the 7MDO was polymerized by ring-opening; and the polymer main chain had ester structural units. The copolymer (A2) had a weight average molecular weight (Mw) of 312,000 and a molecular weight distribution (Mw/Mn) of 2.17. The results including other evaluation results are shown in Table 1, FIG. 1, and FIG. 2. A test piece (120 mm×50 mm×0.4 mm (thickness)) was prepared by hot-press molding at 230° C. and folded 180 degrees by hand at room temperature (23° C.). The test piece did not break, and the fold did not whiten.

Example 3

A well-dried pressure container equipped with a stirrer was purged with nitrogen. Polymerization was carried out in the same manner as in Example 1 except that 25 parts by mass of toluene, 21 parts by mass of methyl methacrylate, 4.1 parts by mass of the 7MDO obtained in Synthesis Example 2, and 0.100 part by mass of n-octyl mercaptan were loaded into the pressure container to give 12 parts by mass of a copolymer (A3). The copolymer (A3) was analyzed by $^1$H-NMR to show that the content of structural units derived from methyl methacrylate was 94.1% by mass; the content of structural units derived from the 7MDO was 5.9% by mass; 100% of the 7MDO was polymerized by ring-opening; and the polymer main chain had ester structural units. The copolymer (A3) had a weight average molecular weight (Mw) of 147,000 and a molecular weight distribution (Mw/Mn) of 3.04. The results including other evaluation results are shown in Table 1.

Example 4

A well-dried pressure container equipped with a stirrer was purged with nitrogen. Into the pressure container, 17.5 parts by mass of toluene, 48.3 parts by mass of methyl methacrylate, 21 parts by mass of the 7MDO obtained in Synthesis Example 2, 0.096 part by mass of n-octyl mercaptan, and 0.002 part by mass of di-t-butyl peroxide (PERBUTYL D available from NOF Corporation) were loaded.

The pressure container was thoroughly purged with nitrogen gas, and then the temperature was raised to 140° C. with stirring. In this example, polymerization was carried out at 140° C. for 4 hours without stiffing, and then the mixture was cooled to room temperature to stop the polymerization. The resulting solution was diluted with 150 parts by mass of toluene and then poured into 8,000 parts by mass of methanol to precipitate a solid. The precipitated solid was filtered and dried well to give 35 parts by mass of a copolymer (A4). The copolymer (A4) was analyzed by $^1$H-NMR to show that the content of structural units derived from methyl methacrylate was 90% by mass; the content of structural units derived from the 7MDO was 10% by mass; 100% of the 7MDO was polymerized by ring-opening; and the polymer main chain had ester structural units. The copolymer (A4) had a weight average molecular weight (Mw) of 285,200 and a molecular weight distribution (Mw/Mn) of 2.84. The results including other evaluation results are shown in Table 1.

Example 5

A well-dried pressure container equipped with a stirrer was purged with nitrogen. Polymerization was carried out in the same manner as in Example 4 except that 62.3 parts by mass of methyl methacrylate, 7.0 parts by mass of the 7MDO obtained in Synthesis Example 2, 0.084 part by mass of n-octyl mercaptan, and 0.0018 part by mass of di-t-butyl peroxide (PERBUTYL D available from NOF Corporation) were loaded into the pressure container to give 40 parts by mass of a copolymer (A5). The copolymer (A5) was analyzed by $^1$H-NMR to show that the content of structural units derived from methyl methacrylate was 95.4% by mass; the content of structural units derived from the 7MDO was 4.6% by mass; 100% of the 7MDO was polymerized by ring-opening; and the polymer main chain had ester structural units. The copolymer (A5) had a weight average molecular weight (Mw) of 695,000 and a molecular weight distribution (Mw/Mn) of 3.25. The results including other evaluation results are shown in Table 1.

Comparative Example 1

A well-dried pressure container equipped with a stirrer was purged with nitrogen. Into the pressure container, 17.5 parts by mass of toluene, 69.3 parts by mass of methyl methacrylate, and 0.002 part by mass of di-t-butyl peroxide (PERBUTYL D available from NOF Corporation) were loaded.

The pressure container was thoroughly purged with nitrogen gas, and then the temperature was raised to 140° C. with stirring. Polymerization was carried out at 140° C. for 4 hours with stirring, and then the mixture was cooled to room temperature to stop the polymerization. The resulting solution was diluted with 150 parts by mass of toluene and then poured into 8,000 parts by mass of methanol to precipitate a solid. The precipitated solid was filtered and dried well to give 35 parts by mass of a polymer (B1). The polymer (B1) was analyzed by $^1$H-NMR to show that the content of structural units derived from methyl methacrylate was 100% by mass. The polymer (B1) had a weight average molecular weight (Mw) of 853,000 and a molecular weight distribution (Mw/Mn) of 1.85. The results including other evaluation results are shown in Table 1, FIG. 1, and FIG. 2. A test piece (120 mm×50 mm×0.4 mm (thickness)) was prepared by hot-press molding at 230° C. An attempt was made to fold the test piece 180 degrees by hand at room temperature (23° C.), and the test piece was broken.

Comparative Example 2

A well-dried pressure container equipped with a stirrer was purged with nitrogen. Polymerization was carried out in the same manner as in Comparative Example 1 except that 69.3 parts by mass of methyl methacrylate, 0.084 part by mass of n-octyl mercaptan, and 0.0018 part by mass of di-t-butyl peroxide (PERBUTYL D available from NOF Corporation) were loaded into the pressure container to give 33 parts by mass of a copolymer (B2). The copolymer (B2) was analyzed by $^1$H-NMR to show that the content of structural units derived from methyl methacrylate was 100% by mass. The copolymer (B2) had a weight average molecular weight (Mw) 176,000 and a molecular weight distribution (Mw/Mn) of 2.02. The results including other evaluation results are shown in Table 1, FIG. 1, and FIG. 2. A test piece (120 mm×50 mm×0.4 mm (thickness)) was prepared by hot-press molding at 230° C. An attempt was made to fold the test piece 180 degrees by hand at room temperature (23° C.), and the test piece was broken.

Comparative Example 3

A well-dried pressure container equipped with a stirrer was purged with nitrogen. Polymerization was carried out in the same manner as in Example 1 except that 25 parts by mass of toluene, 21 parts by mass of methyl methacrylate, 4.1 parts by mass of the 7MDO obtained in Synthesis Example 2, and 0.175 part by mass of n-octyl mercaptan were loaded into the pressure container to give 12 parts by mass of a copolymer (B3). The copolymer (B3) was analyzed by $^1$H-NMR to show that the content of structural units derived from methyl methacrylate was 94.1% by mass; the content of structural units derived from the 7MDO was 5.9% by mass; 100% of the 7MDO was polymerized by ring-opening; and the polymer main chain had ester structural units. The copolymer (B3) had a weight average molecular weight (Mw) of 75,000 and a molecular weight distribution (Mw/Mn) of 2.20. The results including other evaluation results are shown in Table 1.

Comparative Example 4

A well-dried pressure container equipped with a stirrer was purged with nitrogen. Polymerization was carried out in the same manner as in Comparative Example 1 except that 17.5 parts by mass of toluene, 65.8 parts by mass of methyl methacrylate, 3.5 parts by mass of the 7MDO obtained in Synthesis Example 2, 0.105 part by mass of n-octyl mercaptan, and 0.002 part by mass of di-t-butyl peroxide (PERBUTYL D available from NOF Corporation) were loaded into the pressure container to give 30 parts by mass of a copolymer (B4). The copolymer (B4) was analyzed by $^1$H-NMR to show that the content of structural units derived from methyl methacrylate was 98.4% by mass; the content of structural units derived from the 7MDO was 1.6% by mass; 100% of the 7MDO was polymerized by ring-opening; and the polymer main chain had ester structural units. The copolymer (B4) had a weight average molecular weight (Mw) of 200,000 and a molecular weight distribution (Mw/Mn) 2.12. The results including other evaluation results are shown in Table 1.

Comparative Example 5

A well-dried pressure container equipped with a stirrer was purged with nitrogen. Polymerization was carried out in the same manner as in Comparative Example 1 except that 17.5 parts by mass of toluene, 55.3 parts by mass of methyl methacrylate, 14 parts by mass of the 7MDO obtained in Synthesis Example 2, 0.105 part by mass of n-octyl mercaptan, and 0.002 part by mass of di-t-butyl peroxide (PERBUTYL D available from NOF Corporation) were loaded into the pressure container to give 42 parts by mass of a copolymer (B5). The copolymer (B5) was analyzed by $^1$H-NMR to show that the content of structural units derived from methyl methacrylate was 93.1% by mass; the content of structural units derived from the 7MDO was 6.9% by mass; 100% of the 7MDO was polymerized by ring-opening; and the polymer main chain had ester structural units. The copolymer (B5) had a weight average molecular weight (Mw) of 363,000 and a molecular weight distribution (Mw/Mn) of 3.93. The results including other evaluation results are shown in Table 1.

Comparative Example 6

A well-dried pressure container equipped with a stirrer was purged with nitrogen. Polymerization was carried out in the same manner as in Comparative Example 1 except that 17.5 parts by mass of toluene, 34.3 parts by mass of methyl methacrylate, 35.0 parts by mass of the 7MDO obtained in Synthesis Example 2, 0.096 part by mass of n-octyl mercaptan, and 0.0043 part by mass of di-t-butyl peroxide (PERBUTYL D available from NOF Corporation) were loaded into the pressure container to give 21 parts by mass of a copolymer (B6). The copolymer (B6) was analyzed by $^1$H-NMR to show that the content of structural units derived from methyl methacrylate was 75.1% by mass; the content of structural units derived from the 7MDO was 24.9% by mass; 100% of the 7MDO was polymerized by ring-opening; and the polymer main chain had ester structural units. The copolymer (B6) had a weight average molecular weight (Mw) of 223,000 and a molecular weight distribution (Mw/Mn) of 2.60. The results including other evaluation results are shown in Table 1.

Comparative Example 7

A copolymer was synthesized in the same manner as in Example 8 of Japanese Unexamined Patent Application Publication No. 11-228633. Specifically, a well-dried pressure container equipped with a stirrer was purged with nitrogen. Into the pressure container, 25 parts by mass of methyl methacrylate, 25 parts by mass of the 7MDO obtained in Synthesis Example 2, and 0.058 part by mass of dimethyl 2,2-azobis isobutyrate (V-601 available from Wako Pure Chemical industries, Ltd.) were loaded.

The pressure container was thoroughly purged with nitrogen gas, and then the temperature was raised to 60° C. with stirring. Polymerization was carried out at 60° C. for 1 hour with stirring, and then the mixture was cooled to room temperature to stop the polymerization. The resulting solution was poured into 2,000 parts by mass of methanol to precipitate a solid. The precipitated solid was filtered and dried well to give 2.5 parts by mass of a copolymer (B7). The copolymer (B7) was analyzed by $^1$H-NMR to show that the content of structural units derived from methyl methacrylate was 95.5% by mass; the content of structural units derived from the 7MDO was 4.5% by mass; 100% of the 7MDO was polymerized by ring-opening; and the polymer main chain had ester structural units. The copolymer (B7) had a weight average molecular weight (Mw) of 533,000 and a molecular weight distribution (Mw/Mn) of 1.68. The results including other evaluation results are shown in Table 1.

Comparative Example 8

(1) The emulsion containing multi-layered polymer particles (A) prepared in Production Example 1 and the emulsion containing (meth)acrylic ester polymer particles (B) prepared in Production Example 2 were mixed such that the weight ratio of the multi-layered polymer particles (A) to the (meth)acrylic ester polymer particles (B) was 2:1 to prepare a mixed-emulsion. The mixed-emulsion was frozen at −20° C. over 2 hours. The frozen mixed-emulsion was placed in a double volume of warm water at 80° C. and dissolved into a slurry. The slurry was held at 80° C. for 20 minutes, dewatered, and then dried at 70° C. to give an impact modifier in the form of powder.

(2) Using a super mixer, 700 parts by mass of a methyl methacrylate copolymer (methyl methacrylate/methyl acrylate=99.3/0.7 (weight ratio), weight average molecular weight: 89,000) in the form of beads prepared by suspension polymerization and 300 parts by mass of the impact modifier obtained in (1) were mixed to prepare a thermoplastic polymer composition. The evaluation results are shown in Table 1. A test piece (120 mm×50 mm×0.4 mm (thickness))

was prepared by hot-press molding at 230° C. and folded 180 degrees by hand at room temperature (23° C.). Although the test piece did not break, the fold whitened.

The polymer, copolymers, and polymer composition obtained in Examples and Comparative Examples were subjected to methanolysis. The evaluation results of polymers resulting from the methanolysis are shown in Table 1.

copolymers of Examples each have a high total light transmittance and a low haze, which means having high transparency.

The polymer and copolymer of Comparative Examples 1 and 2 each have high transparency, but have a low tensile strain at break due to the absence of 2% to 10% by mass of ester structural units derived from a cyclic ketene acetal

TABLE 1

|  |  | Example 1 | Example 2 | Example 3 | Example 4 | Example 5 |
|---|---|---|---|---|---|---|
| Copolymer composition (% by mass) |  |  |  |  |  |  |
| Methacrylic ester | MMA | 92.0 | 94.8 | 94.1 | 90 | 95.4 |
| Cyclic ketene acetal | 7MDO | 8.0 | 5.2 | 5.9 | 10 | 4.6 |
| Degree of ring-opening polymerization | % | 100 | 100 | 100 | 100 | 100 |
| Copolymer molecular weight |  |  |  |  |  |  |
| Weight average molecular weight | g/mol | 272,000 | 312,000 | 147,000 | 285,200 | 695,000 |
| Mw/Mn |  | 2.23 | 2.17 | 3.04 | 2.84 | 3.25 |
| Copolymer property values |  |  |  |  |  |  |
| Glass transition temperature | ° C. | 87 | 97 | 91 | 80 | 98 |
| Tensile modulus | MPa | 2,700 | 2,800 | 2,800 | 2,700 | 2,600 |
| Tensile strain at break | % | 23 | 32 | 8.4 | 18 | 8.7 |
| Total light transmittance | % | 92 | 92 | 92 | 92 | 92 |
| Haze | % | 0.1 | 0.1 | 0.1 | 0.1 | 0.1 |
| Pencil hardness |  | 2H | 2H | 3H | 2H | 3H |
| Molecular weight after methanolysis |  |  |  |  |  |  |
| Number average molecular weight | g/mol | 1,800 | 2,500 | 2,400 | 1,400 | 2,300 |
| Mw/Mn |  | 1.707 | 1.600 | 1.645 | 1.488 | 1.921 |

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| (Co)polymer composition (% by mass) |  |  |  |  |  |  |  |  |  |
| Methacrylic ester | MMA | 100 | 100 | 94.1 | 98.4 | 93.1 | 75.1 | 95.5 | 99.3 |
| Cyclic ketene acetal | 7MDO | — | — | 5.9 | 1.6 | 6.9 | 24.9 | 4.5 | — |
| Degree of ring-opening polymerization | % | — | — | 100 | 100 | 100 | 100 | 100 | — |
| Molecular weight of copolymers and others |  |  |  |  |  |  |  |  |  |
| Weight average molecular weight | g/mol | 853,000 | 176,000 | 75,000 | 200,000 | 363,000 | 223,000 | 533,000 | 89,000 |
| Mw/Mn |  | 1.85 | 2.02 | 2.20 | 2.12 | 3.93 | 2.60 | 1.68 | 1.85 |
| Property values of copolymers and others |  |  |  |  |  |  |  |  |  |
| Glass transition temperature | ° C. | 120 | 120 | 93 | 114 | 93 | 48 | 95 | 116 |
| Tensile modulus | MPa | 3,200 | 3,100 | 2,700 | 3,100 | 2,700 | 2,000 | 2,700 | 2,100 |
| Tensile strain at break | % | 3.5 | 5.7 | 5.1 | 4.1 | 3.9 | 26 | 5.5 | 17 |
| Total light transmittance | % | 92 | 92 | 92 | 92 | 92 | 92 | 92 | 90 |
| Haze | % | 0.1 | 0.1 | 0.1 | 0.1 | 0.1 | 0.1 | 0.1 | 0.5 |
| Pencil hardness |  | 3H | 3H | 2H | 3H | 3H | 2B | 2H | H |
| Molecular weight after methanolysis |  |  |  |  |  |  |  |  |  |
| Number average molecular weight | g/mol | 464,600 | 87,400 | 2,400 | 7,900 | 2,100 | 500 | 2,400 | 48,000 |
| Mw/Mn |  | 1.834 | 2.006 | 1.581 | 1.710 | 2.053 | 1.254 | 1.623 | 1.850 |

The copolymers of Examples each have 2% to 10% by mass of ester structural units derived from a cyclic ketene acetal monomer, and the structural units each contain an ester structure resulting from ring-opening polymerization. The copolymers of Examples, each having a weight average molecular weight of 80,000 or more and a molecular weight distribution of 1.80 to 3.80, have a high tensile strain at break and exhibit such high stretchability that the copolymers do not break even when folded. In addition, the monomer, do not exhibit stretchability (see FIG. 1 and FIG. 2), and break when folded. Also, the copolymer having a weight average molecular weight of less than 80,000 (Comparative Example 3) and the copolymer containing less than 2% by mass of ester structural units derived from a cyclic ketene acetal monomer (Comparative Example 4) each have a low tensile strain at break and do not exhibit stretchability.

Also, the copolymer having a molecular weight distribution of smaller than 1.75 (Comparative Example 7) and the copolymer having a molecular weight distribution of greater than 3.8 (Comparative Example 5) each have a low tensile strain at break and do not exhibit stretchability.

The copolymer of Comparative Example 6, which contains more than 10% by mass of ester structural units derived from a cyclic ketene acetal monomer, has high stretchability but has a low glass transition temperature and a low tensile modulus. Such properties may result in a soft material.

Although the introduction of multi-layered polymer particles as in Comparative Example 8 is a commonly known technique for improving stretchability, the copolymer obtained by such a technique of adding rubber has low transparency, whitens when folded, and also has a low pencil hardness.

The invention claimed is:

1. A melt molded article comprising a copolymer comprising:
    80% by mass to 98% by mass of structural units derived from a methacrylic ester monomer; and
    2% to 10% by mass of ester structural units derived from a cyclic ketene acetal monomer,
    the copolymer having a weight average molecular weight of 80,000 or more and a molecular weight distribution of 1.75 to 3.80, and
    wherein the methacrylic ester monomer is methyl methacrylate, wherein the melt molded article has a yield point when performing a tensile test and wherein the copolymer has a glass transition temperature of from 70 to 180° C.

2. The melt molded article according to claim 1, wherein a polymer resulting from methanolysis of all the ester structural units derived from a cyclic ketene acetal monomer in the copolymer have a molecular weight distribution of 2.0 or less.

3. A light guide film comprising the melt molded article according to claim 1.

4. A decorative film comprising the melt molded article according to claim 1.

5. A polarizer protective film comprising the melt molded article according to claim 1.

6. The melt molded article according to claim 1, wherein said melt molded article has a tensile strain at break of 8.4% to 32%.

* * * * *